Patented July 14, 1925.

1,545,595

UNITED STATES PATENT OFFICE.

HARRY S. MORK, OF BROOKLINE, AND GUSTAVUS J. ESSELEN, JR., OF SWAMPSCOTT, MASSACHUSETTS, ASSIGNORS, BY MESNE ASSIGNMENTS, TO S. STERNAU & CO., INC., OF BROOKLYN, NEW YORK, A CORPORATION OF NEW YORK.

FUEL AND PROCESS OF MAKING THE SAME.

No Drawing. Application filed October 1, 1919. Serial No. 327,728.

*To all whom it may concern:*

Be it known that we, HARRY S. MORK, a citizen of the United States, and a resident of Brookline, county of Norfolk, and State of Massachusetts, and GUSTAVUS J. ESSELEN, Jr., a resident of Swampscott, county of Essex, and State of Massachusetts, have invented a certain new and useful Fuel and Process of Making the Same, of which the following is a specification.

The invention relates to solidified fuels composed mainly of alcohol, and has for its objects to provide such a fuel having a soap base, which will burn quietly, which will not liquefy while burning, which may be readily reignited, which will leave but a small amount of residue, which will be non-explosive, and which may be manufactured, transported and used with safety.

A further object is to provide a process of making a fuel having the above characteristics, which may be easily and economically carried out, and in which losses by evaporation and otherwise are reduced to a minimum.

These and further objects will more fully appear in the following specification and claims.

Broadly speaking the invention contemplates a fuel comprising a saponaceous base, a combustible alcoholic solvent, and a volatile combustible liquid or mixture of liquids, the major portion of which are non-alcoholic in character or function.

In carrying out the invention stearic or other saturated non-volatile fatty acid is dissolved in alcohol. The solution is then heated to a temperature somewhat below the boiling point of the alcohol. To the heated solution is added a non-volatile alkali in quantity sufficient to neutralize the fatty acid. While a neutral mixture is desirable, a slight excess of acid or of alkali will not be detrimental.

To the above mixture is added a liquid non-solvent. The temperature is slowly raised but should not reach the boiling point of the mixture. The heating is continued until all or nearly all, of the soap which may have been thrown out of solution by the non-solvent is redissolved, after which the material is allowed to cool; or while still liquid it may be poured into the containers in which it is to be vended and used, and be allowed to solidify therein.

One method of preparing the non-liquefiable fuel is as follows:—8.4 grams of triple pressed stearic acid are dissolved in approximately 90.7 grams of denatured alcohol of from 188 to 190 proof. To this solution is added approximately 32.8 grams of wood alcohol and the solution is heated to about 60° C. To the heated solution is added approximately 1.14 grams of caustic soda dissolved in denatured alcohol. The mixture is vigorously stirred until any of the soap, formed of the stearic acid and caustic alkali, which may separate, is thoroughly dissolved.

The temperature of the liquid is raised to about 70° C., and approximately 65.6 grams of a methyl acetone are added. The mixture is thoroughly agitated during the admission of the acetone in order to redissolve any soap which may be thrown out on the addition of the non-solvent. The temperature is maintained until all, or nearly all, of the soap is redissolved, after which the mixture is allowed to cool, when it will solidify at a temperture in excess of 50° C. If desired the solidified mixture instead of being poured into the container in which it is to be burned, may be cut or otherwise formed to the shape desired and packed in receptacles of any shape or size. When cut into cubes, for example, the cubes may be wrapped in tinfoil, paraffined paper, or other air and liquid proof material, and when stripped of its covering the cube may be burned in the open.

The methyl acetone is a volatile combustible liquid or mixture of liquids, and the acetone which it contains is a non-solvent of the soap. The acetone therefore causes the soap to retain its solid form while the mass is burning. The acetone so modifies the crust, formed on the surface of the fuel during the combustion, that the crust is less dense than if the acetone is not present. The acetone, owing to the fact that it has a higher vapor pressure than either denatured or wood alcohol, produces a fuel wherein relighting is greatly facilitated.

It is to be understood that the proportions given are merely approximate and may be varied to a considerable extent.

Instead of using combined denatured and wood alcohols either of those substances may be employed alone as depends upon the character of flame desired, or for other reasons, and more or less water may be used in the mixture.

Other liquids than methyl acetone possessing similar functions in the mixture may be used, the proportions necessary for use depending on the composition of those liquids, but any liquid which in effect reduces the solubility of the soap in the alcohol, and at the same time raises the gelatinizing temperature of the mixture may be used. Examples of such other liquids are, various makes of commercial acetone, methyl acetate, etc.

Instead of stearic acid other saturated non-volatile fatty acids as for example palmitic acid, may be used.

Instead of dissolving the acid in the alcohol or alcohols, as described above, the acid and alkali may be combined to form the soap which latter may be dissolved in the alcohol.

Instead of employing sodium hydroxide as neutralizing agent in the soap, potassium hydroxide, ammonia or the like may be used.

In accordance with the provisions of the patent statutes the principle of the invention has been described together with what is now considered to be the best embodiment thereof; but it is to be understood that the embodiment described is merely illustrative and the invention may be carried out in other ways.

Having now described the invention what is claimed and desired to be secured by Letters Patent, is:

1. A solid infusible fuel, comprising alcohol, the reaction product of a fatty acid and a non-volatile caustic alkali, and a liquid non-solvent of the reaction product, the non-solvent forming a considerable proportion of the fuel.

2. A solid infusible fuel, comprising alcohol, the reaction product of a saturated non-volatile fatty acid and a caustic alkali, a free saturated non-volatile fatty acid, and a volatile liquid non-solvent of the reaction product, the non-solvent forming a considerable proportion of the fuel.

3. A solid infusible fuel, comprising alcohol, the reaction product of a saturated non-volatile fatty acid and caustic soda, and a volatile liquid non-solvent of the reaction product, the non-solvent forming a considerable proportion of the fuel.

4. A solid infusible fuel, comprising alcohol, the reaction product of a fatty acid solid at normal temperature and caustic soda, a free fatty acid, and a volatile liquid non-solvent of the reaction product, the non-solvent forming a considerable proportion of the fuel.

5. A solid infusible fuel, comprising alcohol, the reaction product of stearic acid and caustic soda, there being a small proportion of free acid in the mixture, and acetone, the acetone forming a considerable proportion of the fuel.

6. A solid infusible fuel, comprising alcohol, a water-soluble soap, a saturated fatty acid, and acetone, the acetone forming a considerable proportion of the fuel.

7. A solid infusible fuel, consisting of denatured alcohol, wood alcohol, a water-soluble soap, a free saturated fatty acid, acetone, and water, the acetone forming a considerable proportion of the fuel.

8. The process of making an alcohol fuel, which comprises dissolving an acid obtained from fat in alcohol, adding a caustic alkali to the solution, the amount of alkali being preferably insufficient to neutralize all of the acid, and adding a volatile non-solvent of the acid alkali reaction product to the mixture, the non-solvent forming a considerable proportion of the mixture.

9. The process of making an alcohol fuel, which comprises dissolving an acid obtained from fat in alcohol, adding a caustic alkali to the solution, the amount of alkali being preferably insufficient to neutralize all of the acid, and adding acetone to the mixture, the acetone forming a considerable proportion of the mixture.

10. The process of making an alcohol fuel, which comprises dissolving a fatty acid in a relatively large amount of denatured alcohol, heating the solution, adding a small amount of caustic soda, adding acetone in quantity sufficient to raise the bulk of the mixture approximately 50%, raising the temperature of the mixture, and allowing the mixture to cool.

11. The process of making an infusible solidified alcohol fuel, which comprises dissolving approximately 8.4 grams of stearic acid in about 90.7 grams of denatured alcohol of from 188 to 190 proof, adding approximately 32.8 grams of wood alcohol and heating the solution to about 60° C., dissolving about 1.14 grams of caustic soda in approximately 10 grams of denatured alcohol, adding the dissolved caustic soda to the solution with vigorous stirring, adding slowly approximately 65.6 grams of acetone to the solution, while maintaining the temperature of the mass at approximately 70° C. with agitation, and allowing the mixture to cool.

This specification signed and witnessed this 20th day of September, 1919.

HARRY S. MORK.
GUSTAVUS J. ESSELEN, JR.

Witnesses to the signature of Harry S. Mork:
CHAS. E. SWETT,
EARL P. STEVENSON.

Witnesses to the signature of Gustavus J. Esselen, Jr.:
JOHN STEVENS,
DOUGLAS E. SCOTT.